Patented Sept. 29, 1942

2,297,588

UNITED STATES PATENT OFFICE 2,297,588

SEPARATION OF PHENOLS AND ALKYLATED PRODUCTS THEREOF

Donald R. Stevens, Wilkinsburg, and Clarence J. Livingstone, Pittsburgh, Pa., assignors to Gulf Research & Development Company, Pittsburgh, Pa., a corporation of Delaware No Drawing. Application March 7, 1942, Serial No. 433,828

14 Claims. (Cl. 260—624)

This invention relates to the separation of one or more phenols from a mixture thereof, and it comprises a method in which a mixture of isomeric phenols, having boiling points too close to permit separation by commercially applicable fractional-distillation methods, is subjected to alkylation by known methods, resulting in the formation of alkylation products of the individual isomers, said alkylation products being insoluble in dilute aqueous alkali solution and having relatively widely spaced boiling points, are separated by washing with dilute aqueous alkali solution as well as by fractional distillation, and at least one of the separated products is then de-alkylated or partially de-alkylated to produce the corresponding original phenol or a derivative thereof; all as more fully hereinafter set forth and described hereinbelow.

This application is a continuation-in-part of our copending applications for United States Letters Patent Serial No. 180,224, filed December 16, 1937, and Serial No. 285,436, filed July 19, 1939.

In accordance with the process of our invention as set forth herein, highly alkylated phenols are produced as intermediate or final products. These alkylated phenols are useful commercially for various purposes, for example, as antioxidants for petroleum oils and the like. They are also useful as intermediates in resin making; in producing "pure phenolic oil-soluble resins" for example, and for other purposes. Where it is not desired to carry the de-alkylation step so far as to reduce all the alkylated products formed in the alkylation step back to the original phenols, e. g. individual cresols, xylenols, ethyl-phenols or the like, the highly alkylated intermediate products are retained as such. Thus, in one particular mode of operation referred to hereinbelow, a mixture of isomeric cresols, such as a commercially available mixture of meta- and para-cresols, is alkylated by means of isobutylene, the alkylation products are treated to remove alkali-soluble portions thereof, and the alkali-insoluble material is then fractionated to separate di-butyl meta-cresol and di-butyl para-cresol, respectively. The di-butyl para-cresol is valuable as an antioxidant for petroleum oils and is retained as such, whereas the di-butyl meta-cresol (of lower antioxidant value) may then be subjected to de-alkylation, resulting in the re-formation of commercially pure meta-cresol.

It will therefore be apparent that our invention has two main aspects. In one aspect, it contemplates the isolation of an individual phenolic isomer from a mixture of several isomers. In the other aspect, it contemplates recovery of individual alkylation products, for example, a butyl para-cresol, in relatively pure form.

While our invention is applicable to the separation of various phenolic isomers, it will be convenient and illustrative first to discuss its application to cresols. The ordinary and cheapest commercial source of these is coal tar. From that source, various grades of mixed cresols are obtained and placed on the market.

The boiling points of the three cresols are as follows:

| | ° C. |
|---|---|
| Ortho-cresol | 191.5 |
| Meta-cresol | 202.8 |
| Para-cresol | 202.8 |

Separation of ortho-cresol is therefore easily effected by ordinary fractionation, as is commonly done by the manufacturers of coal-tar products, who offer for sale various mixtures of m-cresol and p-cresol containing little if any o-cresol. These meta-para mixtures find wide acceptance in the synthetic resin industry. The latter industry would for many purposes greatly prefer to employ pure meta-cresol, but the latter cannot be obtained cheaply from coal-tar. All m-cresol and all p-cresol available in commercial quantities in pure form is made by expensive methods.

A mixture of m-cresol and p-cresol may readily be alkylated by subjecting it to contact with certain olefins containing 4 or 5 or even more carbon atoms per molecule, in the presence of small amounts of an acid condensing agent, or even in some cases merely under heat and pressure. Various condensing agents may be used, including aluminum chloride, ferric chloride, boron trifluoride, phosphoric acid and the like, but sulfuric acid is preferred. Various specific methods of effecting the alkylation are disclosed in the copending application of Stevens & Gruse Serial No. 136,504, filed April 12, 1937, now U. S. Patent No. 2,202,877, and in the earlier applications of which Serial No. 136,504 is in part a continuation. The alkylation may also be effected by means of suitable tertiary alcohols, such as tertiary-butyl alcohol, in a known manner.

We have found that the butylation or alkylation of the isomeric m- and p-cresols yields products of relatively widely separated boiling points, which may readily be separated by fractional distillation, and that the added alkyl groups may be split off from the separated products by a simple dealkylation process, yielding the original cresol, e. g. m-cresol, in substantially pure form.

Thus, when a mixture of m- and p-cresols is alkylated with iso-butylene to such extent as to produce mono-butylated products, the following compounds, having the boiling points noted, are obtained:

Mono-tertiary-butyl p-cresol, B. P. 126.5° C./20 mm.
Mono-tertiary-butyl m-cresol, B. P. 130.0° C./20 mm.

These can be separated by careful fractionation, and either one or both may subsequently be de-alkylated to yield the original m- or p-cresol or both.

However, it is for several reasons advantageous to carry the alkylation further, i. e. to such extent as to give di-butylated products, with more widely spaced boiling points as follows:

2,6-di-tertiary-butyl-4-methyl phenol, B. P. 148° C./20 mm.
Di-tertiary-butyl-3-methyl phenol, B. P. 167° C./20 mm.

These products are then separated by fractional distillation. The 2,6-di-tertiary-butyl-4-methyl phenol (derived from para-cresol) is an extremely efficient antioxidant for cracked gasolines, transformer oils, and other hydrocarbon oils, and it is ordinarily preferred to retain it for such use, without de-alkylating. However, the di-tertiary-butyl-3-methyl phenol (derived from meta-cresol) is a relatively poor antioxidant; we therefore prefer to de-alkylate it to give the original m-cresol, or to the mono-butyl derivative, which has some use in resin manufacture.

De-alkylation of the butylated material is readily effected by heating it in the presence of various de-alkylating catalysts such as sulfuric acid, alkyl sulfuric acid esters, sulfonic acids, aluminum chloride and the molecular compounds of aluminum chloride with phenols, alcohols and the like, in this case yielding iso-butylene gas and the original m-cresol, now in substantially pure form and usable as such. The pure m-cresol thus obtained is an advantageous raw material, for many purposes, as for example in the manufacture of phenol-formaldehyde resins. The overall cost of recovering it is low, due partly to the high value of the 2,6-di-tertiary-butyl-4-methyl phenol which usually represents the other main product. Viewed from another standpoint, the process offers an extremely cheap method of making a valuable antioxidant, inasmuch as the value of the pure m-cresol obtained may approach or even exceed the value of the original mixture of m- and p-cresols used as a starting material.

The amount of de-alkylating catalyst required in the de-alkylating step is small. It varies with the exact nature of the alkylated products treated and with the particular de-alkylating agent used but in general we have found that best results are obtained with amounts of de-alkylating catalysts between 0.05 and 2.0 per cent.

We have found it advantageous and desirable to conduct the de-alkylation at atmospheric pressure, although super-atmospheric pressures and sub-atmospheric pressures may be used in some instances. Working at atmospheric pressure, however, renders condensation or recovery of the evolved olefin less difficult, and is of especial advantage where continuous operation is attempted. The operation is conducted by heating the alkylated phenol under a reflux in the presence of a small amount of the de-alkylating catalyst. Evolution of the olefin usually begins at about 80° to 100° C. and increases as the temperature rises. Heating is continued until the evolution of olefin ceases or until the boiling point of the residue indicates that dealkylation has proceeded to the desired point. Ordinarily this will be the point of complete or substantially complete re-formation of the original phenol, e. g. m-cresol, but in special instances partial de-alkylation may be effected. Thus a di-butylated cresol may be reduced to a mono-butylated cresol, wherever it is more advantageous to recover the latter instead of the original cresol.

It will be understood that in using the term "de-alkylation" we are referring to a splitting off of the relatively high alkyl groups added during the original alkylation or condensation step, e. g. tertiary butyl groups. De-alkylation in the contemplated manner does not split off such methyl or ethyl groups as are present in the original phenols; it will not reduce a cresol to phenol ($C_6H_5OH$).

Furthermore, by the term "de-alkylation catalysts" as used herein we mean those compounds, usually of an acid nature, which when present even in relatively small amounts will cause a splitting off of the relatively high alkyl groups without substantial decomposition of the original cresols, xylenols or ethyl phenols upon heating to a suitable temperature.

The de-alkylating catalysts which we have found most advantageous are sulfuric acid with or without a mitigating agent such as ammonium sulfate, boric acid or a polyhydric alcohol; the alkyl esters of sulfuric acid such as di-ethyl sulfate or mono- or di-secondary or tertiary butyl sulfate; the sulfonic acids such as benzene sulfonic acid, beta-naphthalene sulfonic acid and phenol sulfonic acid; aluminum chloride and the molecular complexes formed by aluminum chloride with phenol, alcohols and the like, such as aluminum chloride-cresol.

When sulfuric acid is used as the de-alkylating catalyst best results are obtained with amounts corresponding to about 0.1 to 1.0 by weight of the alkylated cresols. It is generally observed sulfuric acid requires a brief induction period after it is incorporated in the alkylated cresols before active de-alkylation begins. When the proper amount of acid is used the induction period is not sufficiently long to be inconvenient and is often advantageous in affording a convenient handling period.

During de-alkylation with sulfuric acid there may be some tendency for polymerization of the liberated iso-butylene or other olefins as well as for some oxidation-reduction side-reactions. Polymerization is not necessarily disadvantageous as the dimer and trimer of iso-butylene are valuable materials, but oxidation-reduction side-reactions are undesirable. Both polymerization and oxidation-reduction side-reactions can be reduced or eliminated by incorporating in the sulfuric acid a suitable amount of a mitigating agent such as an alkali sulfate, boric acid or a polyhydric alcohol. For example, sulfuric acid saturated with ammonium sulfate at room temperature may be used at temperatures up to the refluxing temperature as a de-alkylating catalyst without substantial polymerization or oxidation-reduction side-reactions. The rate of olefin evolution is generally lower and the induction period is generally longer with mitigated sulfuric acid than with unmitigated acid. Somewhat higher percentages of catalyst may be used with advantage when mitigated acid is used instead of unmitigated acid.

The alkyl esters of sulfuric acid form a class of de-alkylating catalysts having particularly desirable properties. In general they do not cause polymerization or side reactions and are highly efficient, showing increased reaction rates and higher iso-olefin yields than are obtained with corresponding amounts of sulfuric acid alone. Certain of the esters, such as di-ethyl sulfate form reaction products which are more active de-alkylation agents than the original ester and cause an increase in the rate of de-alkylation as the reaction proceeds, whereas with others the reaction proceeds in accordance with the normal laws of mono-molecular reaction. It is often advantageous therefore to use a mixture of esters of these two types so that an even distribution of iso-olefin evolution throughout the de-alkylating period is obtained.

Both the mono- and the di-alkyl esters of sulfuric acid may be used as de-alkylating agents. They are advantageously used in amounts equivalent to about 0.1 to 1.0 per cent of sulfuric acid. However, because of their high efficiency, satisfactory results may be obtained with amounts as low as the equivalent of 0.05 per cent sulfuric acid and because they have little or no tendency to cause polymerization or undesirable oxidation-reduction side-reactions, they can be used in higher concentration, for example, the equivalent of 2.0 per cent or more of sulfuric acid. In order to effect satisfactory de-alkylation with these de-alkylating catalysts an elevated temperature is required. While some de-alkylation can be effected at temperatures as low as 80° C., temperatures of at least about 150° C. are usually required to carry out the reaction in a reasonable length of time. Temperatures which approach the boiling point of the de-alkylated phenol product are particularly advantageous in batch operation. However, in continuous operation higher temperatures may be used advantageously, for example a vapor phase de-alkylation can be carried out at a temperature above the boiling point of the compound being de-alkylated. In general, however, excessively high temperature above about 300° C. should be avoided because of possible undesirable side reactions.

The mono- and the di-secondary and tertiary butyl esters of sulfuric acid are particularly good de-alkylating catalysts. The mono-tertiary butyl ester of sulfuric acid may be prepared in solution satisfactory for use directly as a de-alkylating agent by saturating 63 per cent sulfuric acid solution with iso-butylene or by adding a suitable proportion of sulfuric acid to tertiary butyl alcohol. Similarly, a suitable solution of the mono-secondary butyl ester may be prepared by saturating concentrated sulfuric acid with a mixture of butenes-1 and -2 or by mixing suitable proportions of sulfuric acid with secondary butyl alcohol or normal butyl alcohol. The di-secondary butyl ester may be synthesized for example by reacting sulfuryl chloride with secondary butyl alcohol according to the method of Bushong, Am. Chem. Journ. 30, 212 (1903).

The sulfonic acids such as benzene sulfonic acid, beta-naphthalene sulfonic acid and phenol sulfonic acid are also good de-alkylating catalysts. These compounds are characterized by a low induction period, a high rate of reaction and high olefin yields and are substantially free from tendency to polymerize the liberated olefin or to cause objectionable oxidation-reduction side-reactions. They, like the alkyl esters of sulfuric acid, are advantageously used in amounts corresponding to about 0.1 to 1.0 per cent of the compounds being de-alkylated although larger or smaller amounts may be used. They are advantageously used also at temperatures at or about the refluxing temperature although somewhat lower temperatures may be used with correspondingly lower efficiency.

Sulfuric acid and its alkyl esters as well as the sulfonic acids are characterized by requiring an induction period after their addition to alkylated material before de-alkylation begins. While this induction period is not generally objectionable it can be avoided if desired by the use of aluminum chloride or a molecular complex such as is formed by aluminum chloride with a phenol, alcohol or the like, as a de-alkylating catalyst.

Aluminum chloride, having no induction period, is immediate in its action. It should be used in amounts corresponding to at least 1.0 per cent by weight of the alkylated material. A molecular compound of aluminum chloride and cresol formed by mixing the two at 0° C. exhibits a somewhat slower reaction rate than the $AlCl_3$ itself but still sufficiently fast to be practical. This compound should be used in amounts equivalent to at least 1.0 per cent by weight of aluminum chloride. The temperature at which these aluminum chloride catalysts are used is advantageously at or below the reflux temperature of the de-alkylated product. Excessively high temperatures should be avoided because of the tendency to contamination of the liberated iso-butylene with HCl.

After the de-butylating treatment the debutylated product is withdrawn and, when required, distilled to separate the original phenol, any partially de-butylated product being returned to the de-alkylating step for further treatment.

The evolved iso-butylene may be used for further alkylation of a mixture of isomeric phenols, as before. This iso-butylene is usually of 100 per cent purity although, depending upon the extent of side reactions, it may contain some sulfur dioxide. This sulfur dioxide can be removed by washing with aqueous alkali solution.

The recovered iso-butylene is particularly valuable as a blending stock for use in conjunction with a lean refinery gas in the butylation of further quantities of mixed cresols. It is generally undesirable to use the pure 100 per cent iso-butylene for butylation because of the difficulty of controlling the process. Under such conditions the heat of reaction is sufficiently great so that substantial cooling is necessary and control is difficult to prevent objectionable side reactions. On the other hand, refinery butane cuts which generally contain about 8 to 18 per cent of iso-butylene, when used at atmospheric pressure for butylation are inefficient. Incomplete alkylation of the cresol as well as incomplete utilization of this iso-butylene is obtained. This difficulty can be overcome by using elevated temperatures and pressures, but at these higher temperatures and pressures the butenes-1 and -2 tend to react to form compounds which cannot be readily de-butylated. Good results are more easily obtained by alkylating at atmospheric pressure using gas containing at least about 20 per cent iso-butylene and preferably about 25 per cent iso-butylene. It is advantageous, therefore, to mix the recovered iso-butylene with a refinery butane cut in sufficient proportion to produce a gas mixture containing above about 20.0 per cent iso-butylene and to carry out the alkylation with this gas mixture at or about atmospheric pressure.

The iso-butylene may thus be recycled in continuous operation of the process with distinct advantage. The whole process, or merely the de-alkylation step, may readily be carried out in a continuous manner.

The initial alkylation step may, as has been indicated, be variously carried out. However, we have found it advantageous in most instances to effect the alkylation by passing iso-butylene gas through the phenolic mixture, at atmospheric pressure and at somewhat elevated temperatures of, for example, 160° F., in the presence of up to 10 per cent, say 5 per cent, of $H_2SO_4$, based on the phenols. It is often advantageous to employ a small amount of a mitigating agent, such as boric acid, ammonium sulfate or sodium acid sulfate, along with the sulfuric acid. Thus we have used, with very satisfactory results, a mixture of 95 parts by weight of 95 to 96 per cent $H_2SO_4$ and 5 parts boric acid. The presence of the boric acid or other mitigating agent reduces the tendency toward polymerization and sulfonation reactions.

The preferred alkylation medium is iso-butylene. Olefins of lower molecular weight, such as propylene, and the corresponding paraffins, found in refinery gases (butanes, propane, ethane and methane) do not react readily, if at all, under the conditions employed. The other butylenes are also less reactive; at ordinary pressures they do not form alkylation products to an appreciable extent.

For this reason it is possible to employ gases containing a mixture of iso-butylene with other $C_4$ hydrocarbons and hydrocarbons of lower molecular weight. Where this is done we prefer, when operating at atmospheric pressure or lower, to employ a gas containing iso-butylene in fairly high concentration; that is to say, containing 20 to 25 per cent or more of iso-butylene by weight. At higher pressures, somewhat less concentrated gas may be employed, for example, gases containing down to about 10 per cent by weight of iso-butylene.

Our invention is not, however, limited to the use of iso-butylene as the alkylation medium; other olefins of higher molecular weight, such as tri-methyl-ethylene, may be employed, although iso-butylene is more readily available and has special advantages.

It is desirable in all cases to select an olefinic starting material of such character as to yield alkylated products in which the added alkyl groups are of the same type. Thus, if a mixture of iso-butylene and tri-methyl-ethylene is employed there will be produced a mixture of tertiary butyl phenols and tertiary amyl phenols much more difficult to separate into individual constituents than is true where the only reacting constituent of the gases employed consists of iso-butylene alone or tri-methyl-ethylene alone. In the case of the amylenes, however, both tri-methyl-ethylene and unsymmetrical methyl-ethyl-ethylene yield alkylation products of the same type. The two straight-chain amylenes do not give alkylation products under the conditions contemplated, while the fifth amylene, isopropyl ethylene, reacts somewhat less readily to give secondary amyl phenols.

Our invention does not exclude alkylation in such a manner as to form secondary alkyl phenols, but we have found it preferable and simpler to conduct the alkylation in such a manner as to yield tertiary alkyl phenols.

After alkylation and before fractionation, the alkylated material is washed with dilute aqueous alkali solution, say a 10 to 15 per cent solution of $Na_2CO_3$, or a $NaHCO_3$ solution, to remove acid and any unreacted phenol; the alkylated products produced are for the most part insoluble in dilute alkali. The alkali-washed alkylated phenols are then distilled, any polymers and insufficiently alkylated phenols being separated during distillation, as are the fully alkylated phenols. After separation, de-alkylation of one or more of the alkylated phenols is effected as aforesaid.

However, in referring to washing the alkylated material with dilute aqueous alkali solution, it should be observed that while the di-butylated or di-amylated products of the cresols are insoluble in dilute aqueous alkali solution, the mono-butylated or mono-amylated products are in some instances soluble to some extent in dilute aqueous alkali solution. Consequently, where it is desired to separate such mono-alkylated products of the cresols, neutralization is best effected by means of solid alkali material such as sodium carbonate. Separation may be effected by distilling over dry sodium carbonate. On the other hand, it is sometimes possible to effect separation by alkali-washing where the various alkylated products differ as to solubility in aqueous alkali solution. This also applies to the alkylation products of the xylenols, as will be shown hereinbelow.

In applying the process to any particular mixture of phenolic isomers, attention must of course be paid to the boiling points of these isomers as well as to the boiling points of the alkylated products thereof. Thus, in the case of the cresols, it is usually practicable and advantageous to first separate o-cresol by distillation, the process being then applied to the thereby separated mixture of m-cresol and p-cresol. If for any reason this is inconvenient, separation of ortho cresol may be effected through the di-butyl compound, since the boiling point thereof is sufficiently distinct. The presence of impurities such as xylenols and even the presence of some o-cresol is not at all fatal; it is merely necessary to conduct the alkali-washing and distilling operations in such manner as to separate these materials or the products of alkylation thereof as completely as possible.

As has been indicated hereinabove, it is ordinarily desirable to first fractionate any given mixture of phenols in order to separate the individual phenols as sharply as possible. Thus in starting with a mixture of cresols it is ordinarily advantageous first to remove ortho cresol by ordinary fractional distillation methods. The mixture of meta-cresol and para-cresol thus obtained is then alklated in the manner set forth hereinabove and after alkylation has proceeded to the desired extent, the alkylated products are first washed with dilute aqueous sodium carbonate to neutralize sulfuric acid, and the alkali-insoluble material is then carefully fractionated.

Starting in this manner with a mixture of meta-cresol and para-cresol, fractions are ordinarily obtained as follows: (1) transition material (consisting largely of mono-alkylated cresol); (2) one or more fractions consisting of mono-alkylated meta-cresol and para-cresol;

(3) transition material (largely a mixture of mono-alkylated and di-alkylated cresol); (4) di-alkylated para-cresol; (5) transition material consisting largely of a mixture of di-alkylated para- and meta-cresols; and (6) di-alkylated meta-cresol.

Such residue as remains may be discarded or de-alkylated to obtain the original iso-butylenes and to some extent the original cresols, or it may be worked up for recovery of phenols which have been alkylated by polymers of the olefins used, or other valuable products.

As has been indicated hereinabove, the mono-alkylated cresols are capable of separation by careful fractionation, and after separation may be used as such or de-alkylated to obtain the original cresols. Ordinarily, however, fractions 1, 2 and 3 are combined and returned to the alkylating stage for further alkylation. Fractions 4 and 6, consisting of di-alkylated para-cresol and di-alkylated meta-cresol, respectively, may each be concentrated by refractionation, recrystallization or the like to recover the principal constituents thereof in substantially pure form to be used as antioxidants or otherwise, or they may be subjected to de-alkylation in the manner set forth hereinabove to recover the original cresols. Because of the high antioxidant value of di-butylated para-cresol, we ordinarily prefer not to de-alkylate this material but to retain it as such, whereas the di-butylated meta-cresol is preferably de-alkylated to recover the original meta-cresol. Alternatively, di-butyl meta-cresol, or even the di-butylated para-cresol, may be subjected to a partial de-alkylation to recover mono-alkylated products, wherever such are desirable. The transition fraction 5 is ordinarily re-fractionated; in practice it would simply be added to a subsequent charge to the fractionation stage.

Wherever xylenols or other phenolic bodies are present in the original starting materials, the fractionation of the alkali-insoluble alkylation products from the alkylation stage should be so conducted as to separate individual alkylation products of these materials. In such case the manner of fractionation will be evident to those skilled in the art from consideration of the data given herein.

The description given hereinabove has had reference to the separation of the cresols but the process is also useful in separating other individual phenols, such as xylenols and ethyl phenols from a mixture of isomers, the process depending upon the difference between the stabilities of tertiary-butyl and higher alkylated phenols and phenols in which the alkyl groups consist of methyl and ethyl groups, differences in the solubilities of the lower and the higher alkylated phenols in dilute aqueous alkali and also upon the relatively great differences in boiling points between the tertiary-butyl-phenol or tertiary-amyl-phenol isomers.

The process is readily adaptable, with only slight modification in detail, to the separation of individual xylenols from a mixture of the several isomers. The theoretically possible xylenols, and their boiling points, are as follows:

*Group A*

| | °C. |
|---|---|
| 2,4-di-methyl phenol; B. P. | 211.5 |
| 2,5-di-methyl phenol; B. P. | 211.5 |
| 2,6-di-methyl phenol; B. P. | 212 |

*Group B*

| | °C. |
|---|---|
| 2,3-di-methyl phenol; B. P. | 218 |
| 3,5-di-methyl phenol; B. P. | 219 |

*Group C*

| | °C. |
|---|---|
| 3,4-di-methyl phenol; B. P. | 225 |

Crude cresylic acid can readily be separated by ordinary fractional distillation into portions corresponding to the three groups mentioned, prior to alkylation.

In applying the process to Group A, separation of the 2,6-di-methyl phenol from the 2,4- and 2,5-xylenols is readily effected. Upon alkylation with iso-butylene in the manner indicated above the 2,6-di-methyl phenol forms an alkali-soluble compound 2,6-di-methyl-4-tertiary-butyl phenol, B. P. 137.6/20 mm., while the 2,4- and 2,5-methyl phenols form alkali-insoluble compounds having boiling points as follows:

2,4-di-methyl-6-tertiary-butyl phenol; B. P. 132° C./20 mm. 2,5-di-methyl-4-tertiary-butyl phenol; B. P. 153.6° C./20 mm.

By washing the alkylation product with dilute aqueous alkali any excess acid and partially alkylated products can be separated along with the 2,6-di-methyl-4-tertiary-butyl phenol. The latter compound may then be separated from the alkali solution and de-alkylated to recover pure 2,6-di-methyl phenol. After washing the alkylation products with dilute aqueous alkali the alkali-insoluble portion is fractionally distilled.

The fraction containing the 2,4-di-methyl-6-tertiary-butyl phenol may then be purified by recrystallization or the like, the purified product being useful as an antioxidant for petroleum oils. The fraction containing the 2,5-di-methyl-4-tertiary-butyl phenol is reheated with acid to recover the original 2,5-di-methyl phenol. Alternatively, the first mentioned fraction may be reheated in the presence of a small amount of de-alkylating agent to liberate the iso-butylene and re-form the original 2,4-di-methyl phenol.

In applying the process to Group B, we have found that the 3,5-di-methyl phenol is not readily capable of alkylation with iso-butylene in the manner described. The 2,3-di-methyl phenol can be alkylated with iso-butylene to give a higher boiling, di-butylated product. The latter can be separated from the unreacted 3,5-xylenol by distillation. It may also be separated by washing with dilute aqueous alkali solution, as it is insoluble therein, while the 3,5-xylenol is readily soluble in dilute alkali. The separation effected in this way illustrates the form of the process of our invention in which it is unnecessary to use fractional distillation, the alkali-insoluble alkylation product being isolated from the unalkylated alkali-soluble material by washing with dilute aqueous alkali. The alkali-insoluble fraction may be de-alkylated directly to produce the original phenol in relatively pure form.

As there is only one isomer in Group C, it is not necessary to apply our process for the separation of this from other isomers. However, 3,4-di-methyl phenol is readily alkylated with iso-butylene to give 3,4-di-methyl-6-tertiary-butyl phenol, which boils at 144.7° C./20 mm. By thus alkylating, fractionally distilling to recover the butylated product, and then dealkylating to recover the original 3,4-di-methyl phenol, the latter can be separated from impurities, other isomers and other phenols. The butylated product (3,4- di-methyl-6-tertiary-butyl phenol) is insoluble in dilute aqueous alkali.

The ethyl phenols as a class can be separated from the xylenols according to the method of our invention and the individual ethyl phenols can be separated and recovered. When the ethyl phenols are present in the crude phenolic products such as coal tar or petroleum cresylic acids suitable modification of the method of separation above outlined may be made to effect their separation.

Ortho ethyl phenol has a boiling point of 207.5° C. at atmospheric pressure and may be contained in small amount in the meta-para cresol fraction if this fraction is not closely cut. Ordinarily, however, the ortho ethyl phenol is collected as a separate fraction intermediate between the meta-para cresol cut and the low boiling xylenol cut. If ortho ethyl phenol is present in the meta-para cresol cut, it can be separated as the di-tertiary-butyl-ortho-ethyl phenol whose boiling point is 156° C./20 mm. This boiling point is sufficiently spaced from that of di-tertiary-butyl-para-cresol (148° C./20 mm.) and that of di-tertiary-butyl-meta-cresol (167° C./20 mm.) for efficient fractionation.

Any meta ethyl phenol present in the original tar acids would ordinarily be contained in the low boiling xylenol cut of their fractionation products. This fraction would contain 2,4-di-methyl-phenol and 2,5-di-methyl phenol, both boiling at 211.5° C./atmos. and meta-ethyl phenol boiling at 214° C./atmos. The 2,6-di-methyl phenol, which is not ordinarily present in coal tar or petroleum cresylic acids, has a boiling point of 212° C./atmos. and would be contained in this fraction if it occurred in the raw material.

This low boiling xylenol fraction containing meta-ethyl phenol may be separated into its component phenols according to the method of our invention, for example, by first butylating the mixture completely. The 2,6-di-methyl phenol forms an alkali soluble compound, 2,6-di-methyl-4-tertiary-butyl phenol, which may be separated by washing the butylation products with dilute aqueous alkali solution. The 2,4-di-methyl-mono-tertiary-butyl phenol (B. P. 132° C./20 mm.), the 2,5-di-methyl-mono-tertiary-butyl phenol (B. P. 153.6° C./20 mm.) and the di-tertiary-butyl-meta-ethyl phenol (B. P. 174° C./20 mm.) formed in the butylation step have sufficiently widely spaced boiling points to permit their separation by fractional distillation. The original phenols can be recovered by a suitable dealkylation step as above outlined.

Any para-ethyl phenol (B. P. 219° C./atmos.) present in the crude cresylic acids would ordinarily be collected in the middle boiling xylenol fraction containing 2,3-di-methyl phenol (B. P. 218° C./atmos.) and 3,5-di-methyl phenol (B. P. 219.5° C./atmos.). Upon complete butylation of this mixture, 2,3-di-methyl-4,6-di-tertiary-butyl phenol (B. P. 174° C./20 mm.) and 2,6-di-tertiary-butyl-4-ethyl phenol (B. P. 154.5° C./20 mm.) are formed, while the 3,5-di-methyl phenol does not butylate. The 3,5-di-methyl phenol can be separated by alkali washing or distillation. The butylation products are readily separated by fractional distillation. As usual, the original phenols can be recovered by a suitable debutylation step.

Since meta-ethyl phenol boils at 214° C./atmos., it may contaminate the middle xylenol fraction. Its di-tertiary-butyl derivative boils at 174.5° C./20 mm. and will be collected along with the di-tertiary-butyl-2,3-di-methyl phenol (174.0° C./20 mm.). Separate recovery of the original phenols of these two compounds may be accomplished by first debutylating the mixture to form meta-ethyl phenol which melts at −4° C. and 2,3-di-methyl phenol which melts at 75° C. and then separating the phenols by recrystallization. Petroleum ether is a satisfactory solvent for this purpose.

As an illustration of a practical embodiment of our process, the following description is given. In this example, the process is employed to recover m-cresol in relatively pure form, and a desirable antioxidant (di-butylated p-cresol), from a standard grade of cresols. This grade, known as "Meta-para grade" by the producers thereof, usually contains about 50 to 60 per cent meta-cresol and about 35 to 40 per cent para-cresol.

In this example, pure iso-butylene gas was passed through 420 parts by weight of the aforesaid mixture of cresols, in the presence of 5 per cent by weight (21 parts) of $H_2SO_4$. The reaction was started at room temperature and the temperature of the mixture rose to about 70° C. during the butylation. Butylation was continued, with agitation, to give a product which, after washing with 10 per cent caustic soda solution, amounted to 760 parts by weight. This product was evidently not completely di-butylated, as the theoretical amount for complete di-butylation would be 855 parts by weight. This was confirmed on fractionation, as a considerable portion of mono-butyl cresols are collected, and in this example, as in other runs, and as will be shown hereinbelow, such mono-butylated cresols as were produced were subsequently re-butylated.

The alkali-insoluble portion, amounting to 760 parts by weight or 810 parts by volume, was then fractionated at 20 mm., using a column having the efficiency of 5.5 theoretical plates, to give fractions as follows:

TABLE I

| Fraction | Volume | Temp. | Nature |
|---|---|---|---|
| | Parts | °C. | |
| A-1 | 18 | 100-125 | Liquid-transition material. |
| A-2 | 60 | 126-128 | Liquid-mono-butyl cresols. |
| A-3 | 57 | 128-131 | Liquid-mono-butyl cresols. |
| A-4 | 41 | 131-145 | Liquid-transition material. |
| A-5 | 60 | 145-148 | Solid-di-butyl-p-cresol (M. P. 66° C.) |
| A-6 | 50 | 148-148 | Solid-di-butyl-p-cresol (M. P. 67° C.) |
| B-1 | 30 | 148-160.5 | Liquid-transition material. |
| B-2 | 23 | 160.5-163.5 | Liquid-transition material. |
| B-3 | 87 | 163.5-166.5 | Solid-di-butyl-m-cresol. |
| B-4 | 230 | 166.5-168 | Solid-di-butyl-m-cresol (M. P. 61° C.) |
| Residue and column hold-up. | 90 | 168 up | Solid-di-butyl-m-cresol (subject to further fractionation). |
| Loss attributed to handling. | 64 | | |

The mono-butylated cresols (fractions A—2 and A—3) were found to constitute fairly satisfactory inhibitors for gasoline and other petroleum oils, but not as good inhibitors as the di-tertiary-butyl-para-cresol found in fractions A—5 and A—6. In this example, fractions A—1, A—2, A—3 and A—4, amounting to a total of 176 parts by volume, were therefore combined and re-butylated with iso-butylene in the presence of 5 per cent by weight of $H_2SO_4$. The product, after alkali-washing was fractionated to give the following fractions:

TABLE II

| Fraction | Volume | Nature |
|---|---|---|
| | Parts | |
| A-7 | 48 | Mono-butyl cresols. |
| A-8 | 37 | Di-butyl-para-cresol. |
| B-5 | 19 | Transition material. |
| B-6 | 78 | Di-butyl-meta-cresol. |

This total experiment therefore gives the following yields of alkylated cresols:

TABLE III

| | Volumes | Per cent |
|---|---|---|
| Mono-butyl cresols | 48 | 7.25 |
| Di-butyl-para-cresol | 147 | 22.2 |
| Transition material | 72 | 10.8 |
| Di-butyl-meta cresol | 395 | 59.6 |

In this example, the transition fractions B—1, B—2 and B—5 were not re-fractionated, but in commercial operation the corresponding transition materials, coming over at temperatures higher than the di-butyl-para-cresol fractions are returned for re-fractionation to a subsequent batch of alkylated material.

In order to demonstrate the recovery of meta-cresol from the di-butylated-meta-cresol recovered in fractions B—3, and B—4 and B—6, 100 parts by weight of di-butylated-meta-cresol thus produced were refluxed with a trace of 63.5 per cent of $H_2SO_4$, using the ice-cooled reflux column, until no further iso-butylene evolution was observed. There were recovered 48.2 parts by weight of meta-cresol, which distilled evenly at 102° C. under 20 mm. pressure, and which on analysis indicated substantially 100 per cent purity.

Although, as has been indicated, the di-butyl-para-cresol fractions obtained have a high antioxidant value and would ordinarily be retained as such for this purpose, a portion of the combined fractions A—5, A—6 and A—8, amounting to 50 parts by weight, was de-butylated by refluxing with 0.14 per cent by weight of 63.5 per cent $H_2SO_4$, thereby recovering 25 parts by weight of a para-cresol fraction distilling mainly between 102.5° and 104° C. under 20 mm. pressure. This fraction, when analyzed by the Raschig nitration method (Zeit. angew. Chem. 31, 759, 1900) gave 100 per cent purity, although the melting point of the material indicates a slightly lower degree of purity.

In practice, when it is desired to recover substantially pure para-cresol from the di-butylated-para-cresol fraction, efficient fractionation is required. Using a 45 plate fractionating column it is possible to recover para-cresol of 98–99 per cent purity.

It is important to observe, with respect to the general practice of the invention, that prior to distilling the alkylated products in order to separate the individual constituents thereof, such products must be well neutralized, because of the fact that traces of acid bodies, if present during the distillation, will cause decomposition and de-alkylation.

With regard to the de-alkylation stage, the use of enough unmitigated sulfuric acid to effect rapid de-alkylation and thereby to secure a more complete reaction sometimes involves a small loss due to sulfonation of the cresols but any sulfonated material thus produced can be employed as a catalyst either in the alkylation stage or subsequent de-butylation. In some instances it is desirable to carry on de-alkylation only so long as iso-butylene evolution is rapid, stopping the reaction only when the rate of iso-butylene evolution slows down, even though de-butylation is incomplete. Fractionation is then employed to recover the original cresol, mono-butylated and di-butylated cresols, which are reprocessed, and sulfonated cresols, which may be sent either to the primary alkylation stage as a cataylst or may be used in subsequent de-alkylation.

Likewise in some instances it may be found desirable to avoid carrying the alkylation step entirely to completion inasmuch as alkylation is not as efficient toward the end of the reaction, and with some catalysts polymerization tends to increase to some extent. However, in all cases the alkylation operation is advantageously so conducted as to favor the formation of di-butylated cresols as distinguished from mono-butylated cresols.

While our invention has been set forth and described with reference to various specific operating and exemplary details, it will be understood that our invention is not limited to such details, except by virtue of the claims hereinafter made.

What we claim is:

1. The process which comprises alkylating with a branched chain olefin a mixture of phenols comprising phenols of the group consisting of the methyl and the ethyl phenols having closely spaced boiling points, to give a mixture of alkylated phenols of relatively widely spaced boiling points, separating the individual components of said last-mentioned mixture and then at least partially de-alkylating a thus separated component by heating it in the presence of a de-alkylation catalyst.

2. The process which comprises alkylating with a branched chain olefin a mixture of phenols comprising phenols of the group consisting of the methyl and the ethyl phenols having closely spaced boiling points to give a mixture of alkali-insoluble alkylated phenols of relatively widely spaced boiling points, neutralizing said last-mentioned mixture, fractionally distilling the alkali insoluble portion to separate individual components, and then at least partly de-alkylating a thus separated component by heating it in the presence of a de-alkylation catalyst.

3. The process of separating a phenol of the group consisting of the methyl and the ethyl phenols from a mixture thereof with an isomeric phenol of closely spaced boiling point, which comprises alkylating the mixture with a branched chain olefin to produce a mixture of alkali-insoluble alkylation products of relatively widely spaced boiling points, neutralizing the last-mentioned mixture, fractionally distilling the alkali-insoluble, neutralized mixture to separate an alkylation product of the first-mentioned phenol, and de-alkylating it to recover the original phenol in relatively pure form by heating it in the presence of a de-alkylation catalyst.

4. The process of recovering meta-cresol in relatively pure form from a mixture of meta-cresol and para-cresol, which comprises alkylating said mixture with a branched chain olefin to produce a mixture of alkylation products of meta-cresol and para-cresol, respectively, separating said alkylation products by fractional distillation, and de-alkylating the alkylation product of meta-cresol to recover the original meta-cresol in relatively pure form by heating it in the presence of a de-alkylation catalyst.

5. The process of recovering para-cresol in relatively pure form from a mixture of meta-cresol and para-cresol, which comprises alkylating said mixture with a branched chain olefin to produce a mixture of alkylation products of meta-cresol and para-cresol, respectively, separating said alkylation products by fractional distillation, and de-alkylating the alkylation product of para-cresol to recover the original para-cresol in relatively pure form by heating it in the presence of a de-alkylation catalyst.

6. The process of recovering meta-cresol in relatively pure form from a mixture of meta-cresol and para-cresol, which comprises alkylating said mixture with a branched chain olefin to produce a mixture of alkali-insoluble alkylation products of meta-cresol and para-cresol, respectively, neutralizing the alkylation products to remove acidic bodies soluble therein, fractionating the alkali-insoluble remainder to separate alkylation products of meta-cresol and para-cresol, respectively, and de-alkylating the alkylation product of meta-cresol to recover the original meta-cresol in relatively pure form by heating it in the presence of a de-alkylation catalyst.

7. The process of recovering meta-cresol in relatively pure form from a mixture of meta-cresol and para-cresol which comprises alkylating said mixture with iso-butylene in the presence of an acid condensing agent to produce a mixture of di-butylated meta-cresol and di-butylated para-cresol, washing the last-mentioned mixture with dilute aqueous alkali solution to remove acidic bodies soluble therein, and fractionally distilling the alkali-insoluble material to separate the di-butylated para-cresol and the di-butylated meta-cresol, and warming the di-butylated meta-cresol in the presence of a de-alkylating catalyst to recover the original metal-cresol in relatively pure form.

8. The process of separating a cresol from a mixture thereof with another cresol of closely related boiling point, which comprises alkylating the mixture with iso-butylene in the presence of an acid condensing agent, removing alkali-soluble material from the alkylated mixture, fractionating the mixture to isolate the di-butylated cresols from the lower-boiling products, re-alkylating the lower-boiling products and again fractionating alkali-insoluble products of such re-alkylation, and finally de-alkylating at least one of the di-butylated cresols to recover the original cresol in relatively pure form by heating in the presence of a de-alkylation catalyst.

9. The process of recovering a phenol in relatively pure form from a mixture of phenols of the group consisting of the methyl and the ethyl phenols which comprises alkylating said mixture with a branched chain olefin to produce a mixture comprising an alkali-insoluble alkylation product of said first-mentioned phenol, isolating said alkylation product by washing with dilute aqueous alkali solution and de-alkylating it to recover the original phenol in relatively pure form by heating it in the presence of a de-alkylation catalyst.

10. The process of recovering a xylenol in relatively pure form from a mixture of xylenols of closely spaced boiling points which comprises alkylating said mixture with a branched chain olefin, to produce a mixture containing an alkylation product of at least one of said xylenols, isolating said product by fractional distillation and warming the thereby isolated product with a de-alkylating catalyst to form the original xylenol and a branched chain olefin.

11. A continuous process for the recovering of an individual phenol in relatively pure form from a mixture of phenols of the group consisting of the methyl and the ethyl phenols of closely spaced boiling points comprising alkylating said mixture with a branched chain olefin to produce a mixture comprising an alkylation product of said phenol, isolating said alkylation product by fractional distillation, warming said alkylation product with a de-alkylating catalyst to produce said phenol and a branched chain olefin and alkylating with said branched chain olefin a further quantity of the mixture of phenols of closely spaced boiling points.

12. The process of recovering a phenol of the group consisting of the methyl and the ethyl phenols, in relatively pure form, from a mixture of phenols of closely spaced boiling points which comprises alkylating said mixture with a branched chain olefin to produce a mixture comprising an alkali-soluble alkylation product of said phenol and alkali-insoluble alkylation products of the remaining phenols of said mixture, isolating said alkali-soluble alkylation product by washing with dilute aqueous alkali solution and de-alkylating it to recover the original phenol in substantially pure form by heating in the presence of a de-alkylation catalyst.

13. The process which comprises treating a mixture of phenols of the group consisting of the methyl and ethyl phenols with a branched chain olefin in the presence of an acid condensing agent, neutralizing the resulting mixture with alkali, separating the alkali insoluble portion from the mixture, fractionally distilling the alkali insoluble portion and heating at least one fraction so produced in the presence of a de-alkylating agent under superatmospheric pressure.

14. In a process of recovering a phenol of the group consisting of the methyl and ethyl phenols, from a mixture thereof with an isomeric phenol of closely spaced boiling point, the steps comprising fractionally distilling a mixture of polyalkylated phenols of widely spaced boiling points formed from said mixture of isomeric phenols and de-alkylating a fraction containing a polyalkylated phenol product of an original phenol, by heating said fraction in the presence of a de-alkylation catalyst.

DONALD R. STEVENS.
CLARENCE J. LIVINGSTONE.